United States Patent Office 3,232,693
Patented Feb. 1, 1966

3,232,693
DYE MIXTURES FOR DYEING AND/OR PRINTING ARTICLES OF LINEAR POLYESTERS
Guenter Lange and Hans Guenter Wippel, Ludwigshafen (Rhine), and Wilhelm Federkiel, Frankenthal, Pfalz, Germany, assignors to Badische Anilin- & Soda-Fabrik Aktiengesellschaft, Ludwigshafen (Rhine), Germany
No Drawing. Filed Mar. 26, 1963, Ser. No. 267,922
Claims priority, application Germany, Mar. 31, 1962,
B 66,629
9 Claims. (Cl. 8—26)

This invention relates to dye mixtures for dyeing and/or printing articles of linear polyesters and to articles of linear polyesters which have been dyed and/or printed with these dye mixtures.

We have found that articles of linear polyesters can be dyed and/or printed in an excellent way by using a dye mixture consisting of 99 to 30 mole percent, preferably 95 to 40 mole percent, of a dye having the general formula:

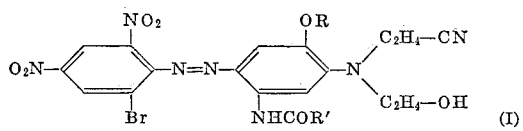

and 1 to 70 mole percent, preferably 5 to 60 mole percent, of a dye having the general formula:

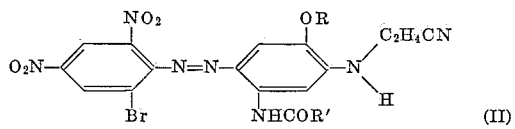

R and R' being identical or different and denoting methyl, ethyl or propyl radicals and preferably methyl or ethyl radicals.

Individual dyes having the Formulae I and II are only absorbed moderately when used for dyeing polyester fibers, and dyes of the general Formula II give a turbid bluish grey. It is therefore surprising that dyeings on polyester fibers obtainable by using mixtures of these dyes do not exhibit any dulling, and in the abovementioned mixing proportions are superior in color strength to dyeings on polyester fibers obtained by using the individual dyes.

The dyes having the general Formula I or II may be prepared by conventional methods by diazotization of 1-amino-2,4-dinitro-6-bromobenzene and coupling with coupling components having the general formulae:

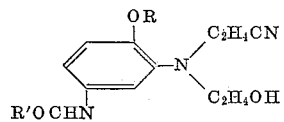

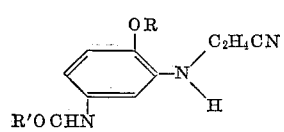

where R and R' have the meanings given above.

The dye mixtures of the kind described above may be prepared by mixing dyes having the general Formulae I and II in the molar ratios stated. It is also possible to couple diazotized 1-amino-2,4-dinitro - 6 - bromobenzene with a mixture containing both of the coupling components of the Formulae III and IV in the desired molar ratio, and to isolate the dye mixture in the conventional way.

It is particularly advantageous however to ethenoxylate a certain amount of a coupling component having the general Formula IV in such a way that only part of the coupling component used is converted into a coupling component of the general Formula III, the resultant mixture of the two coupling components then being united by coupling with diazotized 1-amino-2,4-dinitro-6-bromobenzene to form the desired dye mixture. The coupling components having the general Formula IV may be ethenoxylated in a conventional way by reaction either with ethylene oxide at various temperatures with or without solvent or with ethylene chlorohydrin, if desired with the use of an acid acceptor.

Articles of linear polyesters which may be dyed and/or printed with the dye mixtures are for example sheets, films or textile materials, such as fibers, filaments, threads, flock, woven fabrics, knitted fabrics and non-woven fabrics of polyethylene glycol terephthalate or based on terephthalic acid and p-dimethylolcyclohexane.

The dye mixtures of the abovementioned type are advantageously used in finely divided form. Textile materials of polyesters may be dyed with the new dye mixtures either at temperatures between 95° and 100° C., preferably at about 100° C., at atmospheric pressure, or at temperatures above 100° C., as a rule at 105° to 140° C., at superatmospheric pressure. If full dyeings are to be obtained, particularly at temperatures of about 100° C., it is advantageous to add carriers to the dye liquors, for example aromatic carboxylic acids, such as benzoic acid, salicylic acid or phthalic acid, or their methyl esters, or phenols, such as o- or p-hydroxydiphenyl, or aromatic halogen componuds, such as chlorobenzenes, or aromatic hydrocarbons, such as naphthalene, diphenyl, or carbinols, such as phenyl methyl carbinol.

For printing textile materials of polyesters according to the invention, printing pastes are used which, besides the conventional thickeners and printing auxiliaries, contain the abovementioned dye mixtures in finely divided form. It is advatageous to add carriers to the printing pastes. After the material has been printed, it is given a conventional steaming and finished off. Conventional thickeners include crystal gum, alginates, carob bean flour, starch ethers or starch. Examples of printing auxiliaries are resorcinol, p-hydroxydiphenyl, o-hydroxydiphenyl and β-naphthol.

Dyeings and prints obtainable with the dye mixtures according to this invention are distinguished by very good fastness properties and particularly by very good light fastness, rubbing fastness and thermal fastness properties. The dye mixtures are superior in the color strength of their dyeings on polyethylene terephthalate textile material to dyeings obtained with a dye having the general Formula I or with a dye having the general Formula II. In the brilliance of their dyeings on the same material, they are also superior to dyeings obtainable with a dye having the general Formula II.

The invention is further illustrated by the following examples. The parts given in the examples are parts by weight unless otherwise specified. Parts by volume bear the same relation to parts by weight as the liter to the kilogram.

*Example 1*

100 parts of a polyethylene terephthalate fabric is treated for ninety minutes at a temperature of 100° C. in a dye liquor consisting of 3000 parts by volume of water, 9 parts of finely divided o-phenylphenol and 2 parts of a finely divided dye mixture which has been obtained by coupling one mole of diazotized 1-amino-2,4-dinitro-6-bromobenzene with a mixture of 0.3 mole of 1-(N-cyanoethyl)-amino-2-methoxy-5-acetylaminobenzene and 0.7 mole of 1-(N-cyanoethyl-N-hydroxyethyl)amino-2-methoxy-5-acetylaminobenzene. The dyed fabric is washed with water and then treated for fifteen minutes at 85° C.

in a liquor consisting of 3000 parts by volume of water, 3 parts of sodium dithionite and 3 parts of 32% caustic soda solution; the fabric is then washed again with water.

The mixture of the two coupling components to be used is obtained by partial ethenoxylation of 1-(N-cyanoethyl)-amino-2-methoxy-5-acetylaminobenzene.

A navy blue dyeing of great depth of color and having very good fastness properties is obtained.

If 2 parts of the dye of Formula I or 2 parts of the dye of Formula II (R and R' both being methyl groups in both formulae) be used in this example instead of 2 of the said dye mixture, and in other respects the procedure described is adopted, dyeings are obtained which are much weaker in color.

*Example 2*

100 parts of a polyethylene terephthalate skein material is treated for sixty minutes at 102° C. in a dye liquor consisting of 2000 parts by volume of water, 5 parts of the adduct of 1 mole of ethylene oxide to 1 mole of p-chlorophenol and 2 parts of a finely divided dye mixture containing 80 mole percent of the dye having the Formula I and 20 mole percent of the dye having the Formula II, R and R' in both formulae both being methyl groups. If necessary, the skein material is then given a reductive aftertreatment as described in Example 1.

A deep navy blue dyeing having good to very good fastness properties is obtained.

If 2 parts of one or other of the individual dyes be used in this example instead of 2 parts of the said mixture of the two dyes, and in other respects the procedure is as described above, dyeings considerably weaker in color are obtained.

*Example 3*

100 parts of fiber flock of polyethylene terephthalate is treated for forty-five minutes at 125° C. in a dye liquor consisting of 1000 parts by volume of water, 2 parts of a compound obtained by reaction of 1 mole of sperm oil alcohol with 80 moles of ethylene oxide and subsequent sulphonation, and 2 parts of a finely divided dye mixture containing 50 mole percent of each of the dyes of the general Formulae I and II in which R and R' both denote methyl groups.

A navy blue dyeing is obtained having considerably greater depth of shade than a dyeing obtained by the same process but using 2 parts of one or other individual dye instead of 2 parts of the mixture of the two dyes.

*Example 4*

100 parts of a polyethylene terephthalate fabric is treated for ninety minutes at 100° C. in a dye liquor consisting of 3000 parts by volume of water, 7 parts of a finely divided mixture of isomeric trichlorobenzenes and 3 parts of a finely divided dye mixture containing 60 mole percent of dye of the Formula I and 40 mole percent of dye of the Formula II, both R and R' in both Formulae I and II denoting methyl groups.

A dark blue dyeing of great color strength and with very good fastness properties is obtained which is superior in color strength to dyeings obtained by using the individual dyes instead of the dye mixture, under otherwise identical conditions.

*Example 5*

A polyethylene terephthalate fabric is printed with a printing paste consisting of 20 parts of triisobutyl phosphate, 15 parts of a mixture of the sodium salts of the disulfonimides of hydrocarbons containing in the molecule an average of ten carbon atoms, 650 parts of crystal gum, 275 parts of water and 40 parts of a dye mixture containing 50 mole percent of each of the dyes having the Formulae I and II, both R and R' in the Formulae I and II denoting methyl groups. The printed fabric is dried and steamed for 30 minutes under a pressure of 1.5 atm. gage.

A navy blue print having good depth of color and good to very good fastness properties is obtained.

When 40 parts of either of the two dyes in the mixture is used instead of 40 parts of the mixture, a print is obtained which is weaker in color.

We claim:

1. A dye mixture for dyeing and printing articles of linear polyesters which contains 99 to 30 mole percent of a dye having the formula:

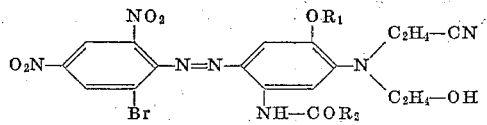

and 1 to 70 mole percent of a dye having the formula:

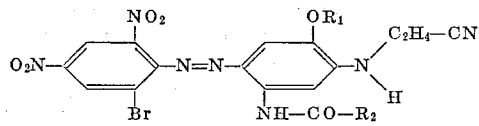

where $R_1$ and $R_2$ are selected from the group consisting of methyl, ethyl and propyl.

2. A dye mixture for dyeing and printing articles of linear polyesters comprising 95 to 40 mole percent of a dye having the formula:

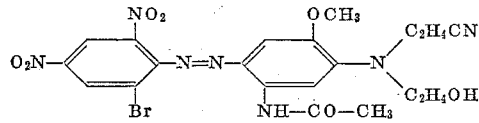

and 5 to 60 mole percent of a dye having the formula:

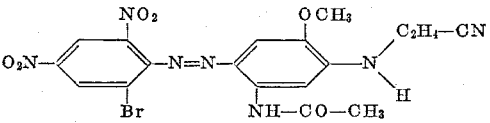

3. A dye mixture for dyeing and printing articles of linear polyesters comprising 95 to 40 mole percent of a dye having the formula:

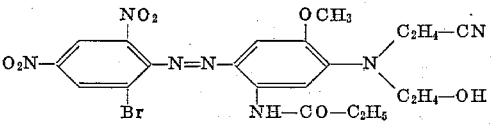

and 5 to 60 mole percent of a dye having the formula:

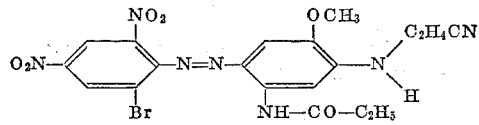

4. A dye mixture for dyeing and printing articles of linear polyesters comprising 95 to 40 mole percent of a dye having the formula:

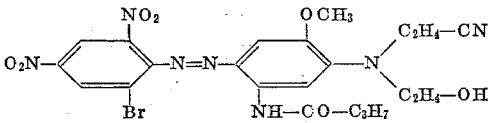

and 5 to 60 mole percent of a dye having a formula:

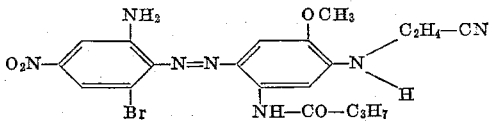

5. A dye mixture as claimed in claim 2 which has been prepared by coupling diazotized 1-amino-2,4-dinitro-6-bromobenzene with a mixture obtained by ethenoxylation to the extent of 40 to 95 mole percent of a compound having the formula:

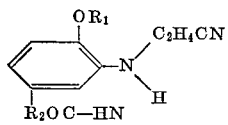

where $R_1$ and $R_2$ are selected from the group consisting of methyl, ethyl and propyl.

6. A linear polyester article colored with a dyestuff mixture of 99 to 30 mole percent of a dye having the formula:

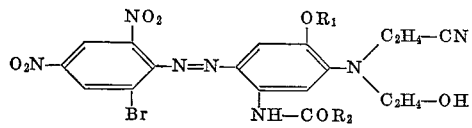

and 1 to 70 mole percent of a dye having the formula:

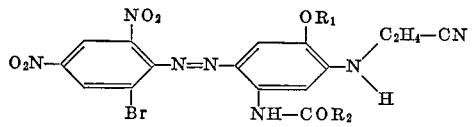

wherein each of $R_1$ and $R_2$ represents a substituent selected from the group consisting of methyl, ethyl and propyl.

7. A linear polyester article colored with a dyestuff mixture of 95 to 40 mole percent of a dye having the formula:

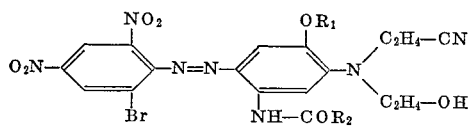

and 5 to 60 mole percent of a dye having the formula:

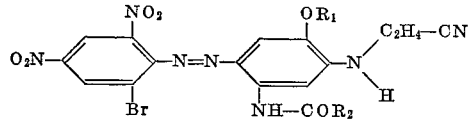

wherein each of $R_1$ and $R_2$ represents a substituent selected from the group consisting of methyl, ethyl and propyl.

8. A linear polyester article colored with a dyestuff mixture of 95 to 40 mole percent of the dye of the formula:

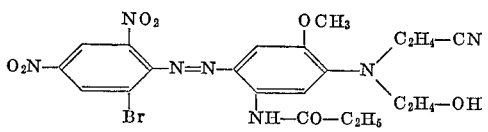

and 5 to 60 mole percent of the dye of the formula:

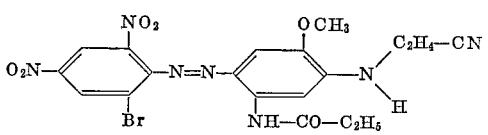

9. A linear polyester article colored with a dyestuff mixture of 95 to 40 mole percent of the dye of the formula:

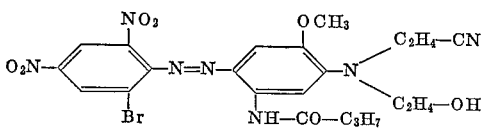

and 5 to 60 mole percent of the dye of the formula:

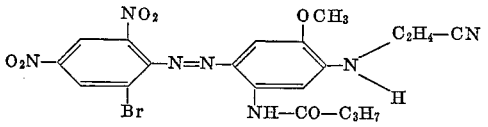

References Cited by the Examiner

UNITED STATES PATENTS

| | | | |
|---|---|---|---|
| 1,978,763 | 10/1934 | Reddelien | 260—205 |
| 2,109,024 | 2/1938 | Holzach | 260—205 |
| 2,485,197 | 10/1949 | Grossman | 8—25 |
| 2,782,187 | 2/1957 | Sartori | 260—205 |
| 2,941,992 | 6/1960 | Rhyner | 260—205 |
| 3,042,478 | 7/1962 | Merian | 8—41 |
| 3,050,516 | 8/1962 | Merian | 8—55 |
| 3,081,295 | 3/1963 | Sterling | 260—205 |

NORMAN G. TORCHIN, *Primary Examiner.*